United States Patent
Isono (10) Patent No.: US 7,031,079 B2
(45) Date of Patent: *Apr. 18, 2006

(54) TAKING LENS SYSTEM

(75) Inventor: Masashi Isono, Aichi-ken (JP)

(73) Assignee: Konica Minolta Opto, Inc., Hachiouji (JP)

( * ) Notice: Subject to any disclaimer, the term of this patent is extended or adjusted under 35 U.S.C. 154(b) by 9 days.

This patent is subject to a terminal disclaimer.

(21) Appl. No.: 10/706,940

(22) Filed: Nov. 14, 2003

(65) Prior Publication Data

US 2004/0105167 A1    Jun. 3, 2004

(30) Foreign Application Priority Data

Nov. 15, 2002   (JP) .............................. 2002-331617

(51) Int. Cl.
*G02B 9/12*        (2006.01)
(52) U.S. Cl. ........................ 359/791; 359/716
(58) Field of Classification Search ................ 359/791, 359/716

See application file for complete search history.

(56) References Cited

U.S. PATENT DOCUMENTS

| 5,715,096 | A  | * | 2/1998 | Meyers ........................ 359/689 |
| 6,414,802 | B1 |   | 7/2002 | Betensky |
| 6,744,570 | B1 | * | 6/2004 | Isono .......................... 359/772 |
| 6,747,810 | B1 | * | 6/2004 | Sato ............................ 359/715 |
| 6,795,253 | B1 | * | 9/2004 | Shinohara .................... 359/716 |
| 2004/0021957 | A1 | * | 2/2004 | Isono .......................... 359/791 |

FOREIGN PATENT DOCUMENTS

JP    2002-98889    4/2002
JP    2002-517773   6/2002

* cited by examiner

*Primary Examiner*—Evelyn A. Lester
(74) *Attorney, Agent, or Firm*—Buchanan Ingersoll PC (57) ABSTRACT

A three-lens-element taking lens system for forming an image on a solid-state image sensor has, from the object side, a first lens element having a positive optical power, an aperture stop, a second lens element having a positive optical power, and a third lens element having a negative optical power and having a concave surface pointing to the image side. Of the first and second lens elements, one is a glass lens element and the other is a plastic lens element. The third lens element is a plastic lens element.

23 Claims, 4 Drawing Sheets

FIG.4A — FNO=2.80 — SPHERICAL ABERRATION / SINE CONDITION (d, g, c, SC)

FIG.4B — Y'=2.3 — ASTIGMATISM (DM, DS)

FIG.4C — Y'=2.3 — DISTORTION%

FIG.5A — FNO=2.80 — SPHERICAL ABERRATION / SINE CONDITION (d, g, c, SC)

FIG.5B — Y'=3.3 — ASTIGMATISM (DM, DS)

FIG.5C — Y'=3.3 — DISTORTION%

FIG.6A

FNO=4.00

— d
--- g
--- c
----- SC

-0.1　0.1
SPHERICAL SINE
ABERRATION CONDITION

-0.1　0.1
ASTIGMATISM

-5.0　5.0
DISTORTION%

TAKING LENS SYSTEM

This application is based on Japanese Patent Application No. 2002-331617 filed on Nov. 15, 2002, the contents of which are hereby incorporated by reference.

BACKGROUND OF THE INVENTION

1. Field of the Invention

The present invention relates to a taking lens system, and more particularly to a compact taking lens system suitable for use in a digital input apparatus (such as a digital still camera or digital video camera) that takes in an image of a subject by means of a solid-state image sensor.

2. Description of the Prior Art

In recent years, as personal computers and the like become more and more popular, digital still cameras and digital video cameras (hereinafter collectively referred to as "digital cameras"), which permit easy entry of image data into digital equipment, have been becoming more and more popular for personal use among general users. Such digital cameras are expected to become even more widespread as image data input devices in the future.

Solid-state image sensors, such as CCDs (charge-coupled devices), used in digital cameras have been made increasingly small, and accordingly further miniaturization is sought in digital cameras themselves. As a result, miniaturization is eagerly sought also in taking lens systems, which occupy the largest volumes in digital input devices. The easiest way to make a taking lens system smaller is to make a solid-state image sensor smaller. However, this involves making photosensitive elements smaller, and thus makes the solid-state image sensor more difficult to fabricate, and in addition requires higher performance in the taking lens system.

On the other hand, making a taking lens system smaller while keeping the size of a solid-state image sensor unchanged inevitably brings the exit pupil position closer to the image plane. When the exit pupil position is brought closer to the image plane, the off-axial rays exiting from the taking lens system are obliquely incident on the image plane. This makes it impossible to make the most of the light-condensing ability of the microlenses provided in front of the solid-state image sensor, with the result that the obtained image shows extremely uneven brightness between in a central portion and in a peripheral portion thereof. This can be avoided by bringing the exit pupil position of the taking lens system farther away from the image plane, but this inevitably makes the taking lens system as a whole unduly large.

Furthermore, in keen competition for lower prices in recent years, lower costs have been increasingly eagerly sought in taking lens systems. To meet these requirements, U.S. Pat. No. 6,414,802 and Japanese Patent Applications Laid-Open No. 2002-98889 propose taking lens systems composed of three lens elements for use with solid-state image sensors.

However, the taking lens system proposed in U.S. Pat. No. 6,414,802 is composed solely of plastic lens elements, and thus has the disadvantage of a large deterioration in performance against variation in temperature. Moreover, this taking lens system has an angle of view of about 50 degrees, which is insufficient for it to be used as a taking lens system. On the other hand, the taking lens system proposed in Japanese Patent Application Laid-Open No. 2002-98889 is composed of two glass lens elements and one plastic lens element, but this construction, despite using two glass lens elements, has the disadvantage of a large deterioration in performance against variation in temperature. Moreover, the use of two glass lens elements results in high costs.

SUMMARY OF THE INVENTION

An object of the present invention is to provide an inexpensive, compact taking lens system for use with a solid-state image sensor wherein glass and plastic lens elements are arranged appropriately to achieve satisfactory optical performance with little deterioration in performance against variation in temperature.

To achieve the above object, according to one aspect of the present invention, a three-lens-element taking lens system for forming an image on a solid-state image sensor is provided with, from the object side, a first lens element having a positive optical power, an aperture stop, a second lens element having a positive optical power, and a third lens element having a negative optical power and having a concave surface pointing to an image side. Here, of the first and second lens elements, one is a glass lens element and the other is a plastic lens element. Moreover, the third lens element is a plastic lens element.

According to another aspect of the present invention, a three-lens-element taking lens system for forming an image on a solid-state image sensor is provided with, from the object side, a first lens element having a positive optical power, an aperture stop, a second lens element having a positive optical power, and a third lens element having a negative optical power. Here, of the first and second lens elements, one is a glass meniscus lens element and the other is a plastic meniscus lens element. Moreover, the third lens element is a plastic meniscus lens element having a concave surface pointing to an image side or a plastic biconcave lens element.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
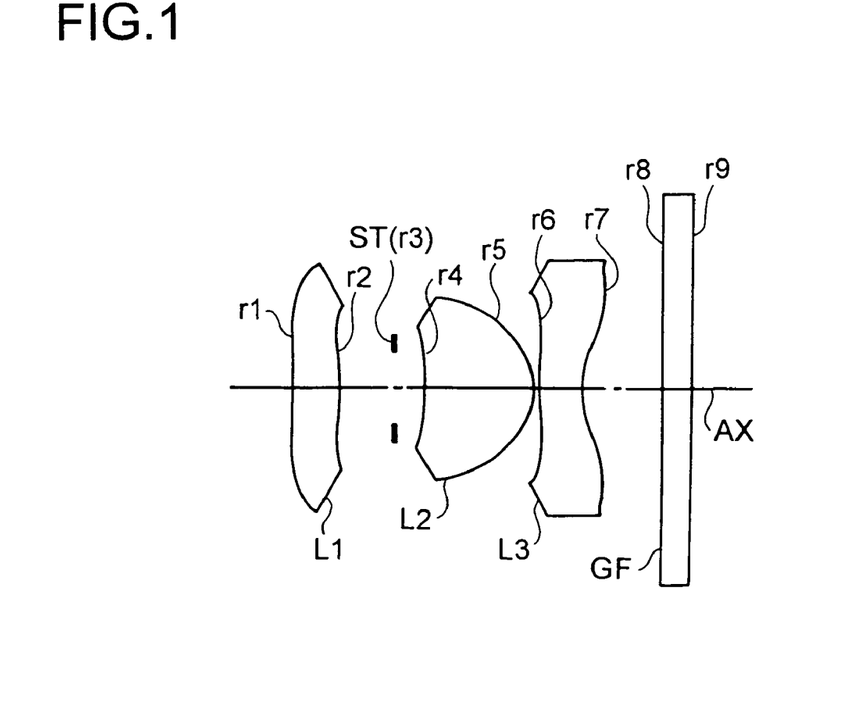
FIG. 1 is a lens construction diagram of a first embodiment (Example 1) of the invention.
Figure 2:
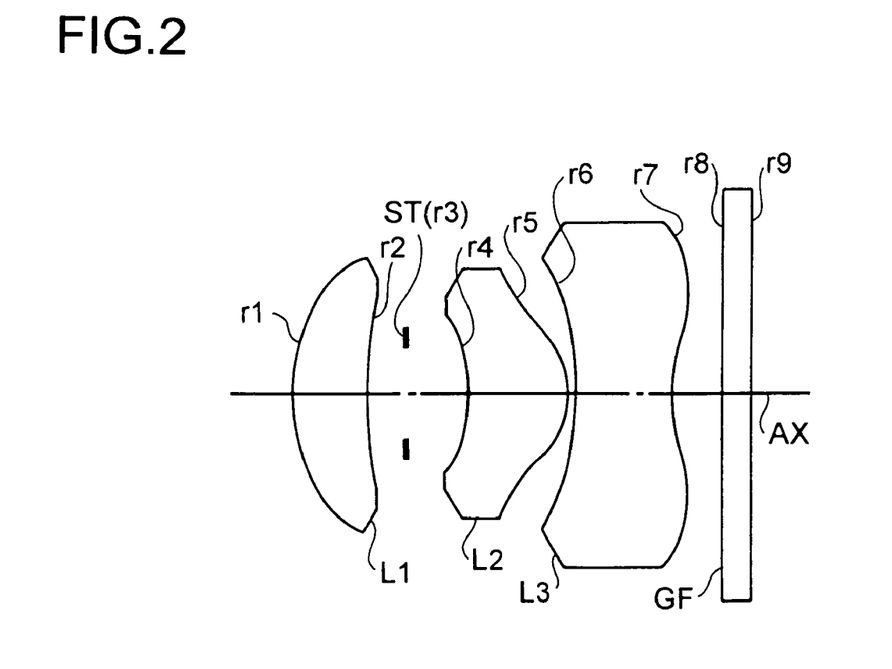
FIG. 2 is a lens construction diagram of a second embodiment (Example 2) of the invention.
Figure 3:
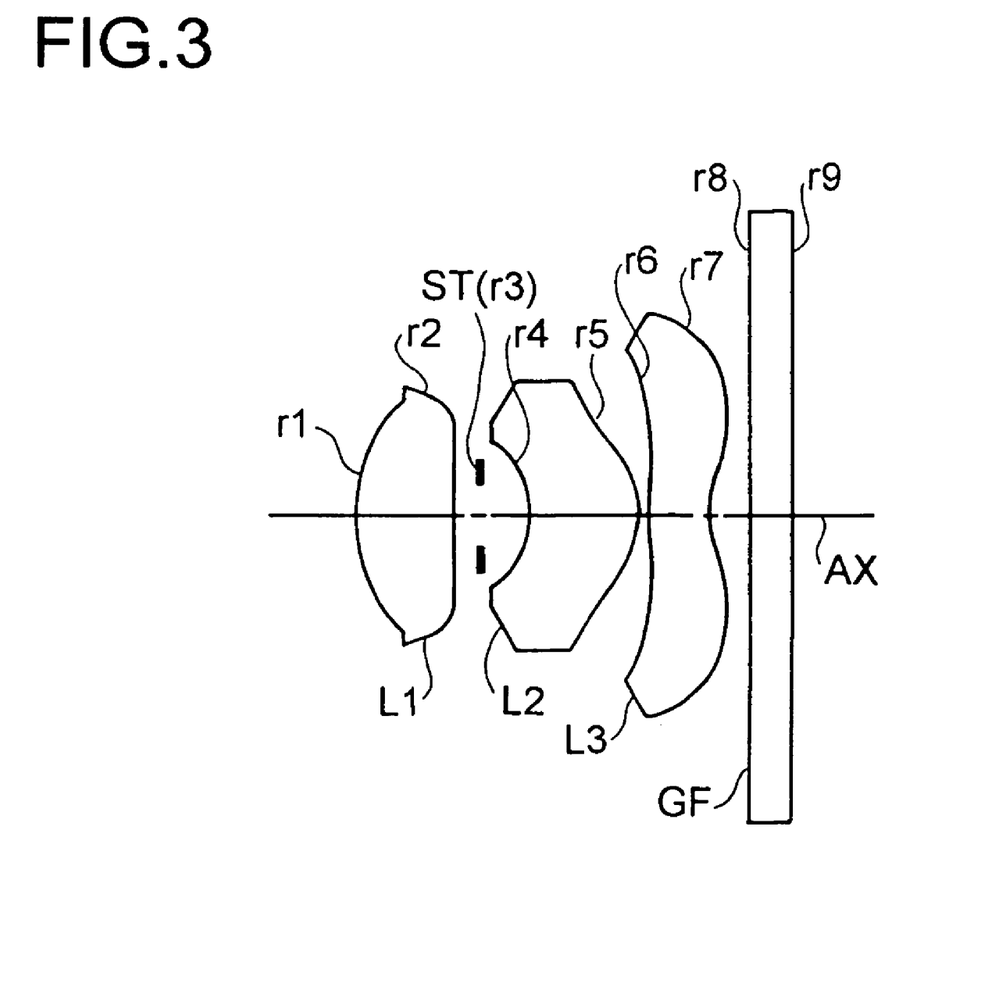
FIG. 3 is a lens construction diagram of a third embodiment (Example 3) of the invention.
Figure 4A:
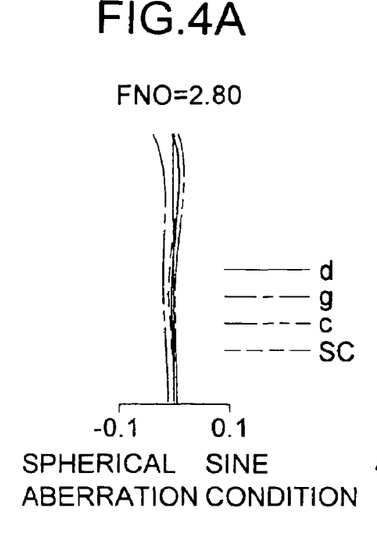
FIGS. 4A to 4C are aberration diagrams of Example 1.
Figure 4B:
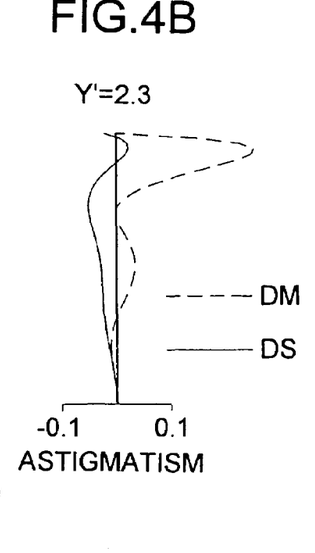
Figure 4C:
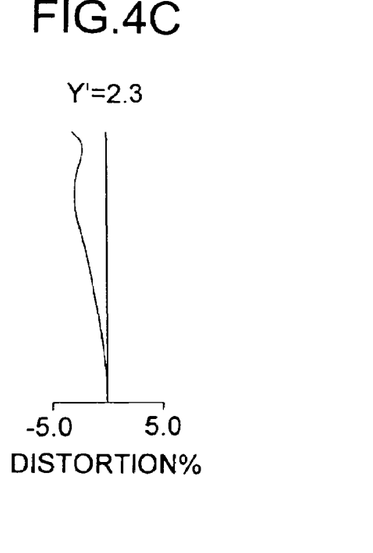
Figure 5A:
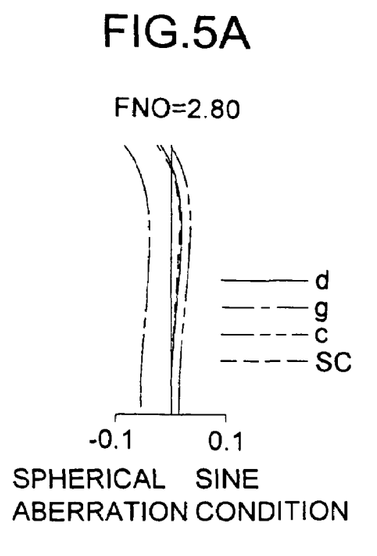
FIGS. 5A to 5C are aberration diagrams of Example 2.
Figure 5B:
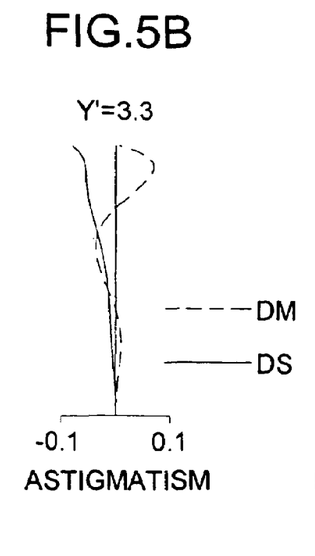
Figure 5C:
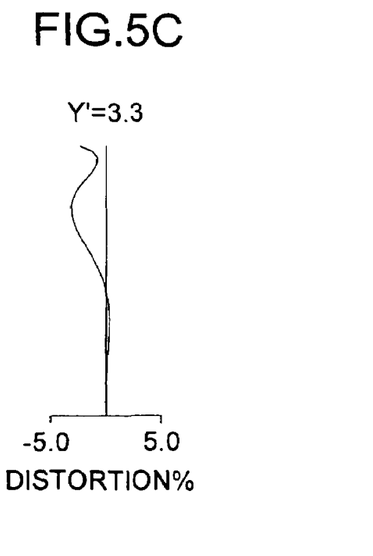
Figure 6A:
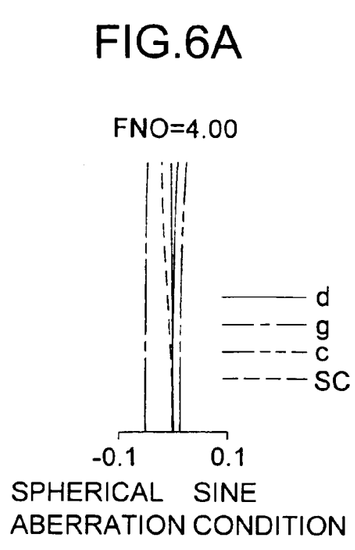
FIGS. 6A to 6C are aberration diagrams of Example 3.
Figure 6B:
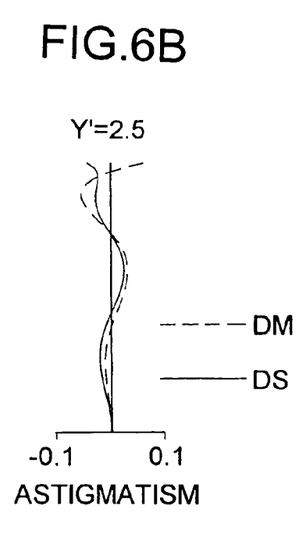
Figure 6C:
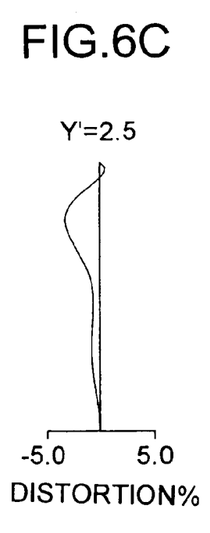

Hereinafter, taking lens systems embodying the present invention will be described with reference to the drawings. FIGS. 1 to 3 show the lens construction, as seen in an optical section, of the taking lens systems of a first to a third embodiment, respectively, of the invention. The taking lens systems of these embodiments are all single-focal-length lens systems designed for image taking purposes (for example, in a digital camera), i.e., for forming an optical image on a solid-state image sensor (for example, a CCD). In all these embodiments, the taking lens system has a three-lens-element construction composed of, from the object side, a first lens element L1 having a positive optical power, an aperture stop ST, a second lens element having a positive optical power, and a third lens element having a negative optical power and having a concave surface pointing to the image side, and, at the image-side end of the taking lens system, there is disposed a glass filter GF having parallel flat surfaces and corresponding to an optical low-pass filter or the like. Moreover, in all of the first to third embodiments, all the lens surfaces (r1, r2, and r4 to r7) are aspherical surface.

Now, the lens construction of each embodiment will be described in more detail. In the first embodiment, the first lens element L1 is a plastic positive meniscus lens element having a convex surface pointing to the image side, the second lens element L2 is a glass positive meniscus lens element having a convex surface pointing to the image side, and the third lens element L3 is a plastic negative meniscus lens element having a concave surface pointing to the image side. In the second embodiment, the first lens element L1 is a glass positive meniscus lens element having a convex surface pointing to the object side, the second lens element L2 is a plastic positive meniscus lens element having a convex surface pointing to the image side, and the third lens element L3 is a plastic negative biconcave lens element. In the third embodiment, the first lens element L1 is a glass positive meniscus lens element having a convex surface pointing to the object side, the second lens element L2 is a plastic positive meniscus lens element having a convex surface pointing to the image side, and the third lens element L3 is a plastic negative meniscus lens element having a concave surface pointing to the image side.

In all of the first to third embodiments, the taking lens system has a positive-positive-negative optical power arrangement (an optical power is a quantity given as the reciprocal of a focal length), a glass lens element is used as one of the first and second lens elements L1 and L2, a plastic lens element is used as the other, and a plastic lens element having a concave surface pointing to the image side is used as the third lens element L3. This makes it possible to achieve a proper balance between the exit pupil position, optical performance, cost, compactness, and productivity required in a taking lens system for use with a solid-state image sensor. The conditions that should better be fulfilled to effectively achieve this will be described below.

First, the conditional formulae that should preferably be fulfilled by the taking lens system of each embodiment, i.e., the conditional formulae of which the fulfillment is preferable in a taking lens system of the type like that of each embodiment, will be described. It is to be noted, however, that it is not necessary to fulfill all the conditional formulae described below simultaneously; that is, the fulfillment of whichever of those conditional formulae are appropriate in a given optical construction provides the corresponding benefits and advantages. Needless to say, it is preferable that as many of the conditional formulae as possible be fulfilled from the viewpoint of optical performance, miniaturization, production and assembly, and other factors.

It is preferable that conditional formula (1) below be fulfilled.

$$0.3 < f/fG < 2.6 \quad (1)$$

where
  f represents the focal length of the taking lens system as a whole; and
  fG represents the focal length of the glass lens element having a positive optical power.

Conditional formula (1) defines the conditional range that should preferably be fulfilled by the positive glass lens element in the positive-positive-negative arrangement to achieve a proper balance between temperature-related variation in performance and the various aberrations produced. Disregarding the lower limit of conditional formula (1) results in large temperature-related variation in performance. By contrast, disregarding the upper limit of conditional formula (1), while helping reduce temperature-related variation in performance, leads to large distortion and coma.

It is preferable that conditional formula (2) below be fulfilled.

$$0.05 < TG/fG < 1.35 \quad (2)$$

where
  TG represents the axial thickness of the glass lens element having a positive optical power; and
  fG represents the focal length of the glass lens element having a positive optical power.

Conditional formula (2) defines the conditional range that should preferably be fulfilled by the positive glass lens element in the positive-positive-negative arrangement to achieve a proper balance between temperature-related variation in performance and the conditions for the fabrication of the glass lens element. Disregarding the upper limit of conditional formula (2) results in large temperature-related variation in performance. By contrast, disregarding the lower limit of conditional formula (2), while helping reduce temperature-related variation in performance, results in making the glass lens element too thin. This makes it impossible to secure a sufficient thickness in a peripheral portion of the lens element, and thus makes it impossible to fabricate it.

It is preferable that conditional formula (3) below be fulfilled.

$$|f3|/fP < 2.6 \quad (3)$$

where
  f3 represents the focal length of the third lens element; and
  fp represents the focal length of the plastic lens element having a positive optical power.

Conditional formula (3) defines the conditional range that should preferably be fulfilled by the plastic lens elements, i.e., the lens elements other than the glass lens element, to achieve a proper balance of temperature-related variation in performance. Disregarding conditional formula (3) results in large temperature-related variation in performance.

It is preferable that conditional formula (4) below be fulfilled.

$$0.05 < T3/f < 0.5 \quad (4)$$

where
  T3 represents the axial thickness of the third lens element; and
  f represents the focal length of the taking lens system as a whole.

Conditional formula (4) defines the conditional range that should preferably be fulfilled by the third lens element L3, i.e., the only negative lens element in the positive-positive-negative arrangement, to achieve a proper balance between temperature-related variation in performance and the various aberrations produced. Disregarding the upper limit of conditional formula (4) results in large temperature-related variation in performance. By contrast, disregarding the lower limit of conditional formula (4), while helping reduce temperature-related variation in performance, leads to large distortion and coma.

It is preferable that conditional formula (5) below be fulfilled.

$$VG>58 \qquad (5)$$

where
VG represents the Abbe number of the glass lens element having a positive optical power.

Conditional formula (5) defines the conditional range that should preferably be fulfilled with respect to the correction of chromatic aberration by the glass lens element. Disregarding conditional formula (5) causes the glass lens element to undercorrect chromatic aberration, resulting in large chromatic aberration as a whole. On the other hand, attempting to fulfill conditional formula (5) by the use of a plastic lens element necessitates the use of an extremely expensive material.

As in any of the embodiments, it is preferable that all the lens elements each have an aspherical surface at least on one side thereof Giving at least one aspherical surface to each of the first to third lens elements L1 to L3 is highly effective in correcting spherical aberration, coma, and distortion. In all the embodiments, the taking lens system is composed solely of refractive lens elements, which deflect incident light by refraction (i.e. lens elements of the type that deflects light at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. Among these types, gradient index lens elements, which have varying refractive indices distributed within a medium, are expensive because of the complicated fabrication process they require. Therefore, in a taking lens system embodying the invention, it is preferable to use lens elements formed of a uniform material as all of the lens elements L1 to L3.

In any of the embodiments, a surface having no optical power (for example, a reflective, refractive, or diffractive surface) may be arranged in the optical path so as to bend the optical path in front of, behind, or in the middle of the taking lens system. Where to bend the optical path may be determined to suit particular needs. By bending the optical path appropriately, it is possible to make apparently slim and compact the digital input apparatus (such as a digital camera) in which the taking lens system is incorporated. As required, in addition to the aperture stop ST, a beam restricting plate or the like for cutting unnecessary light may be arranged.

The taking lens systems of the first to third embodiments are all suitable as compact taking lens systems for use in digital input apparatuses, and, by combining one of those taking lens systems with an optical low-pass filter and a solid-state image sensor, it is possible to build a taking lens apparatus that takes in an image of a subject optically and outputs it as an electrical signal. A taking lens apparatus is used as the main component of a camera that is used to take a still or moving picture of a subject, examples of such cameras including digital cameras, video cameras, and cameras incorporated in or externally fitted to digital video units, personal computers, mobile computers, pen-type scanners, cellular phones, and personal digital assistants (PDAs). A taking lens apparatus is composed of, for example, from the object (subject) side, a taking lens system for forming an optical image of a subject, an optical low-pass filter, and a solid-state image sensor for converting the optical image formed by the taking lens system into an electrical signal.

Thus, the first to third embodiments described hereinbefore include constructions (i) to (iv) as noted below, and, with those constructions, it is possible to realize high-optical-performance, low-cost, compact taking lens apparatuses. By incorporating such a taking lens apparatus in a digital camera or the like, it is possible to enhance the performance and functionality of the camera, and to reduce the costs and size thereof (i) A taking lens apparatus comprising a taking lens system for forming an optical image and a solid-state image sensor for converting the optical image formed by the taking lens system into an electrical signal, the taking lens system comprising, from the object side, a first lens element having a positive optical power, an aperture stop, a second lens element having a positive optical power, and a third lens element having a negative optical power and having a concave surface pointing to the image side, wherein, of the first and second lens elements, one is a glass lens element and the other is a plastic lens element, wherein the third lens element is a plastic lens element, and wherein at least one of conditional formulae (1) to (5) is fulfilled.

(ii) A taking lens apparatus comprising a taking lens system for forming an optical image and a solid-state image sensor for converting the optical image formed by the taking lens system into an electrical signal, the taking lens system comprising, from the object side, a first lens element having a positive optical power, an aperture stop, a second lens element having a positive optical power, and a third lens element having a negative optical power, wherein, of the first and second lens elements, one is a glass meniscus lens element and the other is a plastic meniscus lens element, wherein the third lens element is a plastic meniscus lens element having a concave surface pointing to the image side or a plastic biconcave lens element, and wherein at least one of conditional formulae (1) to (5) is fulfilled.

(iii) A taking lens apparatus as described in (i) or (ii) above, wherein all the lens elements each have at least one aspherical surface.

(iv) A taking lens apparatus as described in one of (i) to (iii) above, wherein all the lens elements are each formed out of a uniform material.

Used as the solid-state image sensor is, for example, a CCD or CMOS (complementary metal oxide semiconductor) sensor having a plurality of pixels. The optical image formed by the taking lens system is converted into an electrical signal by the solid-state image sensor. The optical image to be formed by the taking lens system passes through the optical low-pass filter having a predetermined cutoff frequency characteristic that depends on the pixel pitch of the solid-state image sensor, and meanwhile the optical image has its spatial frequency characteristic so adjusted as to minimize so-called aliasing noise generated when the optical image is converted into an electric signal. The signal produced by the solid-state image sensor is subjected to predetermined digital image processing, image compression processing, and the like as required, and is recorded in a memory (such as a semiconductor memory or an optical disk) as a digital video signal; in some cases, the signal is transferred to another apparatus through a cable or after being converted into an infrared signal.

In the embodiments, a glass filter GF is used as the optical low-pass filter disposed between the last surface of the taking lens system and the solid-state image sensor. It is possible, however, to use instead an optical low-pass filter of any other type that suits the digital input apparatus in which the taking lens system is incorporated. For example, it is possible to use a birefringence-type low-pass filter made of quartz or the like having an appropriately aligned crystal axis, a phase-type low-pass filter that achieves the required optical cut-off frequency characteristics by exploiting diffraction, or a low-pass filter of any other type.

EXAMPLES

Hereinafter, practical examples of taking lens systems embodying the present invention will be presented with reference to their construction data and other data. Tables 1 to 3 show the constriction data of Examples 1 to 3, respectively. Examples 1 to 3 correspond to the first to third embodiments described hereinbefore. Thus, the lens construction diagrams (FIGS. 1 to 3) of the first to third embodiments also show the lens constructions of Examples 1 to 3, respectively. In the construction data of each example, ri (i=1, 2, 3, . . .) represents the radius of curvature (mm) of the i-th surface from the object side, di (i=1, 2, 3, . . .) represents the i-th axial distance (mm) from the object side, and Ni (i=1, 2, 3, and 4) and vi (i=1, 2, 3, and 4) respectively represent the refractive index (Nd) for the d-line and the Abbe number (vd) of the i-th optical element from the object side. Shown together with these data are the focal length (f, mm) and the f-number (FNO) of the taking lens system as a whole. Table 4 shows the values of the conditional formulae as actually observed in Examples 1 to 3.

A surface of which the radius of curvature ri is marked with an asterisk (*) is a refractive optical surface having an aspherical shape or a surface that exerts a refractive effect equivalent to that of an aspherical surface. The surface shape of such an aspherical surface is defined by formula (AS) below. The aspherical surface data of the aspherical surfaces used in each example are also shown together with the other data mentioned above.

$$X(H)=(C0·H^2)/(1+mt;epmrl; \sqrt{1ital-}\ominus·Cmedbeginbold0endboldsup2resetital·Hmedsup2resetrlxmx)+\Sigma(Ai·H^i) \quad (AS)$$

where
X(H) represents the displacement along the optical axis AX at the height H (relative to the vertex);
H represents the height in a direction perpendicular to the optical axis AX;
C0 represents the paraxial curvature (=the reciprocal of the radius of curvature);
$\epsilon$ represents the quadric surface parameter; and
Ai represents the aspherical surface coefficient of i-th order (the data are omitted if Ai=0).

FIGS. 4A to 4C, 5A to 5C, and 6A to 6C are aberration diagrams of Examples 1 to 3, respectively. Of these aberration diagrams, those with their numbers suffixed with "A" show spherical aberration, those with their numbers suffixed with "B" show astigmatism, and those with their numbers suffixed with "C" show distortion, with FNO representing the f-number and Y' representing the maximum image height (mm). In the diagrams showing spherical aberration, the solid line (d), dash-and-dot line (g), and dash-dot-dot line (c) represent the spherical aberration (mm) observed for the d-, g-, and c-lines, respectively, and the broken line (SC) represents the deviation (mm) from the sine condition. In the diagrams showing astigmatism, the broken line (DM) and the solid line (DS) represent the astigmatism (mm) observed for the d-line on the meridional and sagittal planes, respectively. In the diagrams showing distortion, the solid line represents the distortion (%) observed for the d-line.

As described above, according to the present invention, it is possible to realize an inexpensive, compact taking lens system for use with a solid-state image sensor which offers satisfactory optical performance in combination with little deterioration in performance against variation in temperature. By incorporating a taking lens system according to the invention in a digital input apparatus such as a camera incorporated in a cellular phone or a digital camera, it is possible to enhance the performance and functionality of the apparatus, and to reduce the costs and size thereof.

TABLE 1

Example 1
f = 3.382, FNO = 2.80

| Radius of Curvature | Axial Distance | Refractive Index | Abbe Number |
|---|---|---|---|
| r1* = −10.748 | | | |
| | d1 = 0.756 | N1 = 1.53048 | v1 = 55.72 (L1) |
| r2* = −6.165 | | | |
| | d2 = 0.933 | | |
| r3 = ∞ (ST) | | | |
| | d3 = 0.500 | | |
| r4* = −12.672 | | | |
| | d4 = 1.734 | N2 = 1.48749 | v2 = 70.44 (L2) |
| r5* = −0.898 | | | |
| | d5 = 0.100 | | |
| r6* = 5.623 | | | |
| | d6 = 0.700 | N3 = 1.58340 | v3 = 30.23 (L3) |
| r7* = 1.145 | | | |
| | d7 = 1.300 | | |
| r8 = ∞ | | | |
| | d8 = 0.500 | N4 = 1.51680 | v4 = 64.20 (GF) |
| r9 = ∞ | | | |

Aspherical Surface Data of Surface r1

$\epsilon = -0.49000 \times 10^2$, $A4 = 0.19628 \times 10^{-1}$, $A6 = 0.42261 \times 10^{-2}$,
$A8 = -0.14046 \times 10^{-2}$, $A10 = 0.24571 \times 10^{-3}$
Aspherical Surface Data of Surface r2

$\epsilon = -0.61499 \times 10$, $A4 = 0.46300 \times 10^{-1}$, $A6 = 0.58156 \times 10^{-2}$,
$A8 = -0.55287 \times 10^{-2}$, $A10 = 0.25143 \times 10^{-2}$
Aspherical Surface Data of Surface r4

$\epsilon = -0.10000 \times 10$, $A4 = -0.36178 \times 10^{-1}$, $A6 = -0.35359 \times 10^{-1}$,
$A8 = 0.33661 \times 10^{-1}$, $A10 = -0.76906 \times 10^{-1}$
Aspherical Surface Data of Surface r5

$\epsilon = -0.10000 \times 10$, $A4 = 0.88131 \times 10^{-2}$, $A6 = -0.10394$,
$A8 = 0.66365 \times 10^{-1}$, $A10 = -0.21004 \times 10^{-1}$
Aspherical Surface Data of Surface r6

$\epsilon = -0.19193 \times 10$, $A4 = -0.51842 \times 10^{-1}$, $A6 = 0.75512 \times 10^{-3}$,
$A8 = 0.23514 \times 10^{-2}$, $A10 = -0.21619 \times 10^{-2}$
Aspherical Surface Data of Surface r7

$\epsilon = -0.45157 \times 10$, $A4 = -0.44404 \times 10^{-1}$, $A6 = 0.19663 \times 10^{-1}$,
$A8 = -0.73281 \times 10^{-2}$, $A10 = 0.92529 \times 10^{-3}$

TABLE 2

Example 2
f = 5.403, FNO = 2.80

| Radius of Curvature | Axial Distance | Refractive Index | Abbe Number |
|---|---|---|---|
| r1* = 3.427 | | | |
| | d1 = 1.256 | N1 = 1.58913 | v1 = 61.28 (L1) |
| r2* = 13.824 | | | |
| | d2 = 0.643 | | |

TABLE 2-continued

| | | | |
|---|---|---|---|
| r3 = ∞ (ST) | | | |
| | d3 = 0.972 | | |
| r4* = −3.551 | | | |
| | d4 = 1.640 | N2 = 1.53048 | ν2 = 55.72 (L2) |
| r5* = −1.328 | | | |
| | d5 = 0.100 | | |
| r6* = −31.222 | | | |
| | d6 = 1.584 | N3 = 1.58340 | ν3 = 30.23 (L3) |
| r7* = 2.125 | | | |
| | d7 = 0.800 | | |
| r8 = ∞ | | | |
| | d8 = 0.500 | N4 = 1.51680 | ν4 = 64.20 (GF) |
| r9 = ∞ | | | |

Aspherical Surface Data of Surface r1

$\epsilon = 0.45664$, $A4 = 0.50687 \times 10^{-2}$, $A6 = 0.84990 \times 10^{-3}$,
$A8 = -0.13419 \times 10^{-4}$, $A10 = 0.45261 \times 10^{-4}$
Aspherical Surface Data of Surface r2

$\epsilon = 0.13638 \times 10^{2}$, $A4 = 0.12538 \times 10^{-1}$, $A6 = -0.40314 \times 10^{-2}$,
$A8 = 0.29052 \times 10^{-2}$, $A10 = -0.63264 \times 10^{-3}$
Aspherical Surface Data of Surface r4

$\epsilon = 0.20000 \times 10$, $A4 = -0.17811 \times 10^{-1}$, $A6 = -0.44803 \times 10^{-1}$,
$A8 = 0.25403 \times 10^{-1}$, $A10 = -0.27515 \times 10^{-2}$
Aspherical Surface Data of Surface r5

$\epsilon = 0.28496$, $A4 = -0.90398 \times 10^{-3}$, $A6 = 0.58812 \times 10^{-2}$,
$A8 = -0.40268 \times 10^{-2}$, $A10 = 0.10098 \times 10^{-2}$
Aspherical Surface Data of Surface r6

$\epsilon = 0.0$, $A4 = -0.60414 \times 10^{-1}$, $A6 = 0.15910 \times 10^{-1}$,
$A8 = -0.10850 \times 10^{-2}$, $A10 = -0.90198 \times 10^{-4}$
Aspherical Surface Data of Surface r7

$\epsilon = -0.52095 \times 10$, $A4 = -0.30068 \times 10^{-1}$, $A6 = 0.30856 \times 10^{-2}$,
$A8 = -0.17047 \times 10^{-3}$, $A10 = 0.10885 \times 10^{-6}$

TABLE 3

Example 3
f = 4.212, FNO = 4.00

| Radius of Curvature | Axial Distance | Refractive Index | Abbe Number |
|---|---|---|---|
| r1* = 1.823 | | | |
| | d1 = 1.195 | N1 = 1.48749 | ν1 = 70.44 (L1) |
| r2* = 17.003 | | | |
| | d2 = 0.300 | | |
| r3 = ∞ (ST) | | | |
| | d3 = 0.575 | | |
| r4* = −1.231 | | | |
| | d4 = 1.371 | N2 = 1.53048 | ν2 = 55.72 (L2) |
| r5* = −0.881 | | | |
| | d5 = 0.100 | | |

TABLE 3-continued

| | | | |
|---|---|---|---|
| r6* = 4.980 | | | |
| | d6 = 0.749 | N3 = 1.58340 | ν3 = 30.23 (L3) |
| r7* = 1.193 | | | |
| | d7 = 0.500 | | |
| r8 = ∞ | | | |
| | d8 = 0.500 | N4 = 1.51680 | ν4 = 64.20 (GF) |
| r9 = ∞ | | | |

Aspherical Surface Data of Surface r1

$\epsilon = 0.41144$, $A4 = 0.85264 \times 10^{-2}$, $A6 = 0.61779 \times 10^{-2}$,
$A8 = -0.18563 \times 10^{-2}$, $A10 = -0.12302 \times 10^{-2}$
Aspherical Surface Data of Surface r2

$\epsilon = 0.16000 \times 10^{2}$, $A4 = -0.94292 \times 10^{-2}$, $A6 = -0.39468 \times 10^{-1}$,
$A8 = 0.43553 \times 10^{-1}$, $A10 = -0.19370 \times 10^{-1}$
Aspherical Surface Data of Surface r4

$\epsilon = 0.19571 \times 10$, $A4 = -0.22360 \times 10^{-1}$, $A6 = -0.23890$,
$A8 = 0.29336$, $A10 = 0.36819$
Aspherical Surface Data of Surface r5

$\epsilon = 0.66179 \times 10^{-1}$, $A4 = 0.59525 \times 10^{-1}$, $A6 = -0.70445 \times 10^{-1}$,
$A8 = 0.15571 \times 10^{-1}$, $A10 = 0.54156 \times 10^{-2}$
Aspherical Surface Data of Surface r6

$\epsilon = 0.12482 \times 10$, $A4 = -0.14933$, $A6 = 0.56598 \times 10^{-1}$,
$A8 = -0.76101 \times 10^{-2}$, $A10 = -0.24802 \times 10^{-4}$
Aspherical Surface Data of Surface r7

$\epsilon = -0.60000 \times 10$, $A4 = -0.74292 \times 10^{-1}$, $A6 = 0.64193 \times 10^{-2}$,
$A8 = 0.15186 \times 10^{-2}$, $A10 = -0.29432 \times 10^{-3}$

TABLE 4

| | Conditional Formula (1) f/fG | Conditional Formula (2) TG/fG | Conditional Formula (3) \|f3\|/fP | Conditional Formula (4) T3/f | Conditional Formula (5) VG |
|---|---|---|---|---|---|
| Example 1 | 1.79 | 0.92 | 0.10 | 0.21 | 70.44 |
| Example 2 | 0.73 | 0.17 | 1.05 | 0.29 | 61.28 |
| Example 3 | 1.03 | 0.29 | 1.17 | 0.18 | 70.44 |

What is claimed is:

1. A three-lens-element taking lens system for forming an image on a solid-state image sensor, comprising, from an object side, a first lens element having a positive optical power, an aperture stop, a second lens element having a positive optical power, and a third lens element having a negative optical power and having a concave surface pointing to an image side, wherein, of the first and second lens elements, one is a glass lens element and the other is a plastic lens element, wherein the third lens element is a plastic lens element, and wherein the following condition is fulfilled:

$$0.3 < f/fG < 2.6$$

where f represents a focal length of the taking lens system as a whole; and fG represents a focal length of the glass lens element having a positive optical power.

2. A taking lens system as claimed in claim 1, wherein the first to third lens elements each include at least one aspherical surface.

3. A taking lens system as claimed in claim 1, wherein the first to third lens elements are each formed of a uniform material.

4. A three-lens-element taking lens system for forming an image on a solid-state image sensor, comprising, from an object side, a first lens element having a positive optical power, an aperture stop, a second lens element having a positive optical power, and a third lens element having a negative optical power and having a concave surface pointing to an image side, wherein, of the first and second lens elements, one is a glass lens element and the other is a plastic lens element, wherein the third lens element is a plastic lens element, and wherein the following condition is fulfilled:

$$0.05 < TG/fG < 1.35$$

where TG represents an axial thickness of the glass lens element having a positive optical power; and fG represents a focal length of the glass lens element having a positive optical power.

5. A taking lens system as claimed in claim 4, wherein the first to third lens elements each include at least one aspherical surface.

6. A taking lens system as claimed in claim 4, wherein the first to third lens elements are each formed of a uniform material.

7. A three-lens-element taking lens system for forming an image on a solid-state image sensor, comprising, from an object side, a first lens element having a positive optical power, an aperture stop, a second lens element having a positive optical power, and a third lens element having a negative optical power and having a concave surface pointing to an image side, wherein, of the first and second lens elements, one is a glass lens element and the other is a plastic lens element, wherein the third lens element is a plastic lens element, and wherein the following condition is fulfilled:

$$|f3|/fP < 2.6$$

where f3 represents a focal length of the third lens element; and fP represents a focal length of the plastic lens element having a positive optical power.

8. A taking lens system as claimed in claim 7, wherein the first to third lens elements each include at least one aspherical surface.

9. A taking lens system as claimed in claim 7, wherein the first to third lens elements are each formed of a uniform material.

10. A three-lens-element taking lens system for forming an image on a solid-state image sensor, comprising, from an object side, a first lens element having a positive optical power, an aperture stop, a second lens element having a positive optical power, and a third lens element having a negative optical power and having a concave surface pointing to an image side, wherein, of the first and second lens elements, one is a glass lens element and the other is a plastic lens element, wherein the third lens element is a plastic lens element, and wherein the following condition is fulfilled:

$$0.05 < T3/f < 0.5$$

where T3 represents an axial thickness of the third lens element; and f represents a focal length of the taking lens system as a whole.

11. A taking lens system as claimed in claim 10, wherein the first to third lens elements each include at least one aspherical surface.

12. A taking lens system as claimed in claim 10, wherein the first to third lens elements are each formed of a uniform material.

13. A three-lens-element taking lens system for forming an image on a solid-state image sensor, comprising, from an object side, a first lens element having a positive optical power, an aperture stop, a second lens element having a positive optical power, and a third lens element having a negative optical power and having a concave surface pointing to an image side, wherein, of the first and second lens elements, one is a glass lens element and the other is a plastic lens element, wherein the third lens element is a plastic lens element, and wherein the following condition is fulfilled:

$$VG > 58$$

where VG represents an Abbe number of the glass lens element having a positive optical power.

14. A taking lens system as claimed in claim 13, wherein the first to third lens elements each include at least one aspherical surface.

15. A taking lens system as claimed in claim 13, wherein the first to third lens elements are each formed of a uniform material.

16. A three-lens-element taking lens system for forming an image on a solid-state image sensor, comprising, from an object side, a first lens element having a positive optical power, an aperture stop, a second lens element having a positive optical power, and a third lens element having a negative optical power, wherein, of the first and second lens elements, one is a glass meniscus lens element and the other is a plastic meniscus lens element, and wherein the third lens element is a plastic meniscus lens element having a concave surface pointing to an image side or a plastic biconcave lens element.

17. A taking lens system as claimed in claim 16, wherein the following condition is fulfilled:

$$0.3 < f/fG < 2.6$$

where f represents a focal length of the taking lens system as a whole; and fG represents a focal length of the glass lens element having a positive optical power.

18. A taking lens system as claimed in claim 16, wherein the following condition is fulfilled:

$$0.05 < TG/fG < 1.35$$

where TG represents an axial thickness of the glass lens element having a positive optical power; and fG represents a focal length of the glass lens element having a positive optical power.

19. A taking lens system as claimed in claim 16, wherein the following condition is fulfilled:

$$|f3|/fP < 2.6$$

where f3 represents a focal length of the third lens element; and fP represents a focal length of the plastic lens element having a positive optical power.

20. A taking lens system as claimed in claim 16, wherein the following condition is fulfilled:

$$0.05 < T3/f < 0.5$$

where T3 represents an axial thickness of the third lens element; and f represents a focal length of the taking lens system as a whole.

21. A taking lens system as claimed in claim 16, wherein the following condition is fulfilled:

$$VG > 58$$

where VG represents an Abbe number of the glass lens element having a positive optical power.

22. A taking lens system as claimed in claim 16, wherein the first to third lens elements each include at least one aspherical surface.

23. A taking lens system as claimed in claim 16, wherein the first to third lens elements are each formed of a uniform material.

* * * * *